G. CRANGLE.
Rotary Brick Machine.

No. 16,468.

Patented January 27, 1857.

Witnesses:

Inventor:
George Crangle

UNITED STATES PATENT OFFICE.

GEORGE CRANGLE, OF PHILADELPHIA, PENNSYLVANIA.

IMPROVEMENT IN ROTARY BRICK-MACHINES.

Specification forming part of Letters Patent No. 16,468, dated January 27, 1857.

*To all whom it may concern:*

Be it known that I, GEORGE CRANGLE, of the city of Philadelphia, in the State of Pennsylvania, have invented a new and useful Improvement in Rotary Brick-Machines; and I do hereby declare that the following is a full, clear, and exact description of the construction and operation of the same, reference being had to the accompanying drawings, making a part of this specification, in which—

Figure 1:
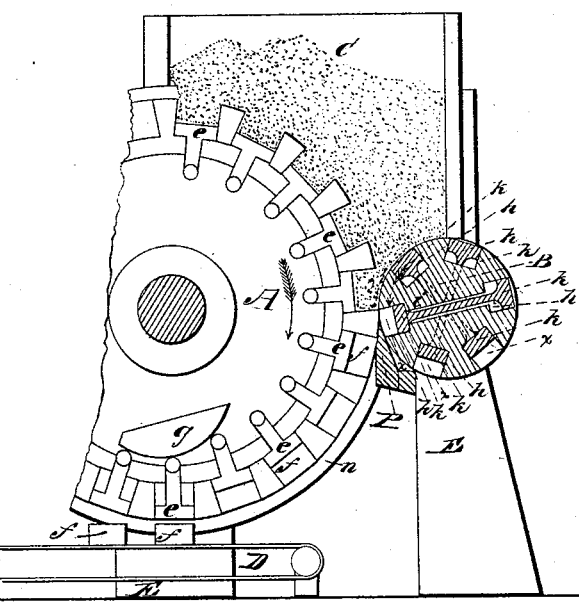
Figure 2:
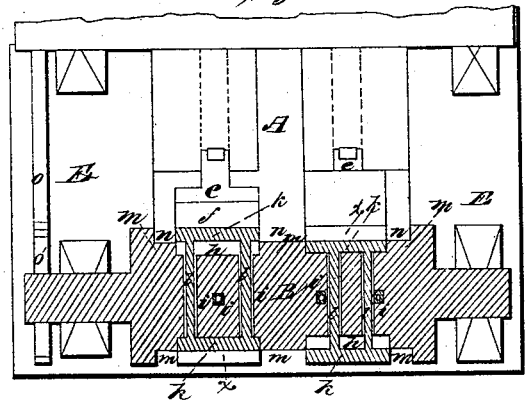

Figure 1 is a vertical transverse section of part of a rotary brick-machine with the invention applied, and Fig. 2 a horizontal section of the same through the centers of the mold and pressing-cylinders.

Like letters indicate the same objects when in both figures.

The nature of my invention consists in making the pressing-roller or small cylinder which is in use for pressing the clay into the molds of a rotary mold-cylinder with narrow recesses fitted with coupled pistons or slides, so that while the spaces between the said recesses serve to press the clay into the molds of the mold-cylinder the said recesses shall serve to receive the surplus clay which may be in contact with the partition which is immediately above the mold which is forming the brick and at the same time discharge from its opposite recess in the said roller the surplus clay which may have been previously received in like manner, whereby I am enabled to work a mold-cylinder and roller in close contact, and thus produce better brick without materially increasing the cost of the machine, as a roller of no greater diameter than will be sufficient for four or six recesses and pressing-faces for each series of molds in the mold-cylinder will be quite sufficient.

Referring to the drawings, A is the mold-cylinder; B, the pressure-roller; C, the clay-hopper; D, the carrying-band, and E the supporting-frame of the whole.

The mold-cylinder is constructed and operated substantially as described in the specification accompanying the Letters Patent granted to me and dated the 3d day of June, 1856, *e e* being the movable bottoms of its molds, *f f* the bricks formed therein, and *g* the discharge-cam.

The hopper C is made with its bottom edges concentric and in close contact with the cylinder A and its two opposite and inner sides, so as to be in the same vertical planes with the two corresponding ends of the molds, so that the width of the hopper for each series of molds (there being either one or more) is exactly equal with the length of the said molds.

The pressure-roller B, and to which the present invention specially relates, is arranged in contact beside and parallel with the mold-cylinder A, and consists of a cylinder of sufficient diameter to admit of its periphery being divided into, say, twelve spaces, six of the exact width each of a mold, and six of the exact width of a partition between any two of the molds, the said mold and partition spaces alternating around the roller, as shown in Fig. 1. The spaces which are of the width of the partitions are each "sunk" or mortised out, so as to form a rectangular recess $h\ h$ therein about two inches deep and exactly the length of the mold, and there being six, (or other duplicate number,) each one is diametrically opposite another, and therefore admits of a direct diametrical communication between it and its opposite recess by means of a hole or holes $i\ i$. A piston or slide $k\ k$, in thickness about half the depth of the recess, is fitted accurately in each recess so as to move easily up and down therein, and each two opposite pistons are attached together by a rigid rod or rods $l\ l$, so that when the one piston rests upon the bottom of its mortise the other one is flush with the surface of the pressing parts of the roller on the opposite side, as shown in Fig. 1. The holes through which the rods $l\ l$ pass are made roomy and placed so that the rod or rods of each pair of pistons may move longitudinally without interfering with those of the others. At each end of the recesses $h\ h$ a rectangular groove $m$, about an inch deep, is cut entirely around the roller for the admission therein of a corresponding projection $n$, which is made on the surface of the mold-cylinder at each end of the molds when the two cylinders are placed together in contact in the frame, as shown in the drawings.

In the operation of this machine, the mold-cylinder A and pressing-roller B being placed in the frame so as to rotate in contact and with the same surface velocity in the directions of the arrows by means of the gear-wheels $o\ o'$ on their respective shafts, the recesses $h\ h$ of the roller must necessarily come exactly opposite to the partitions, respectively, of the mold-cylinder when properly adjusted, and it is obvious that when the hopper C is supplied with clay the molds within the same will become filled with clay by gravitation, and that as the said filled molds pass in contact with the pressing-surfaces of the roller B the latter will condense the clay more firmly into the said molds, and that the clay which is in contact with the partition adjoining above will enter the recess $h$ of the roller, forcing back the piston thereof, and thus allow the next pressing-surface of the roller to operate in direct contact upon the mouth of the next mold, pressing the clay therein into a brick of the size and form of the mold, and so on in succession continuously, the clay $x$, which is received by the mortise or recess in the roller, being forced out and falling to the ground when the opposite piston is subjected to the same action as its fellow, as described. As the pressure-roller acts only upon a part of the outer surface of the brick which is being formed at any one instant of time, a wedge-formed piece $p$ is fixed horizontally to the frame and parallel with the cylinders, so as to bear with its inner side concentrically against the mold-cylinder and directly beneath the place of contact of the mold-cylinder and the pressure-roller, so as to prevent the possibility of that part of the brick which has been passed over by the respective face on the pressure-roller from rising as the said face passes over the other part. A curve proportionate to the diameter of the mold-cylinder will be left upon the outer side of the bricks, but this curve may be obviated, if desired, by substituting a beveled instead of a curved form to the faces of those parts of the roller which press the bricks, in which case the lower or the then slightly-projecting part of the faces of the roller must be made to enter the mold; but as this suggested modification of the pressing-faces of the roller would require greater accuracy in the construction and conjoined movements of the two cylinders, the curved form described and set forth is considered the most suitable for all common bricks, especially as a mold-cylinder of four feet diameter will produce but a very slight curve upon the outer face of the brick.

For cylinders of, say, two-feet diameter a compensation curve may be given to each of the pressing-surfaces of the roller B—viz., a curve to each of sufficiently less radius than that of the roller as will produce a face of sufficient curve to roll a straight face upon the brick, its consequently higher part entering proportionally within the mold.

I do not claim the use of a roller for pressing the clay into the molds of a rotary mold-cylinder, nor do I claim any particular form or construction of the pressing-surfaces of the roller B, nor do I claim a pressing-cylinder with recesses and moving platens for receiving the clay from the surfaces of the respective partitions of the opposite mold-cylinder and forming it into bricks by the pressure of the said surfaces, as in Zach. M. Paul's machine, patented October 3, 1854; but

What I claim as my invention, and desire to secure by Letters Patent, is—

The pressing-roller or small cylinder B, having the recesses $h\ h$, fitted with the coupled moving pistons or slides $k\ k$, so that as the surplus clay on the face of the partition which is next above the mold then forming a brick is pressed into the recess of the roller B by the said partition the opposite piston shall thereby be caused to discharge the previously-taken up clay which is in the recess at the opposite side of the pressing-roller, the said pressing-roller B being constructed and operating in combination with the mold-cylinder A, in the manner and for the purpose set forth and described.

GEORGE CRANGLE.

Witnesses:
B. MORISON,
JNO. B. KENNEY.